United States Patent [19]

Einhorn et al.

[11] 3,995,822
[45] Dec. 7, 1976

[54] SWIVEL HOOKS AND METHOD FOR MAKING THE SAME

[75] Inventors: Ruediger Einhorn, Katonah; Lee Richard Chasen, Port Chester, both of N.Y.

[73] Assignee: Coats & Clarks, Inc., New Rochelle, N.Y.

[22] Filed: Nov. 10, 1975

[21] Appl. No.: 630,277

Related U.S. Application Data

[62] Division of Ser. No. 549,313, Feb. 12, 1975.
[52] U.S. Cl. .................. 248/304; 24/230.5 AD; 24/230.5 SS; 248/218; 248/339
[51] Int. Cl.² ................. A47F 5/00; E06B 7/28
[58] Field of Search .......... 248/217, 218, 304, 305, 248/308, 339; 24/230.5 AD, 230.5 SS, 230.5 T, 230.5 R; 264/242

[56] References Cited

UNITED STATES PATENTS

| 311,246 | 1/1885 | Herrick et al. ............ 248/304 |
| 366,871 | 7/1887 | Petrie .................. 24/230.5 AD |
| 769,454 | 9/1904 | Ankers ................... 248/225 |
| 850,623 | 4/1907 | Clark .................. 24/230.5 T |
| 852,285 | 4/1907 | Murray ................ 24/230.5 AD |
| 860,762 | 7/1907 | McGrady ................. 248/339 |
| 2,577,350 | 12/1951 | Morin ................. 264/242 X |
| 3,891,172 | 6/1975 | Einhorn .................. 248/223 |

*Primary Examiner*—J. Franklin Foss
*Attorney, Agent, or Firm*—Burgess Ryan and Wayne

[57] ABSTRACT

A swivel hook has a hook member with a frustoconical projection terminating in a cylindrical extension of diameter less than the smaller diameter end of the frustoconical portion. The mounting member for the swivel hook has a frustoconical hole into which the frustoconical projection is fitted. The elements of the swivel hook are adapted to be cast of a metal or molded of a plastic, in such a manner that the bearing surfaces of one of the elements forms a part of the die for the bearing surfaces of the other element. During the casting or molding process, the cylindrical extension is beyond the frustoconical hole, and the elements are moved relative to each other following casting or molding to move the cylindrical extension into alignment with the frustoconical hole.

15 Claims, 15 Drawing Figures

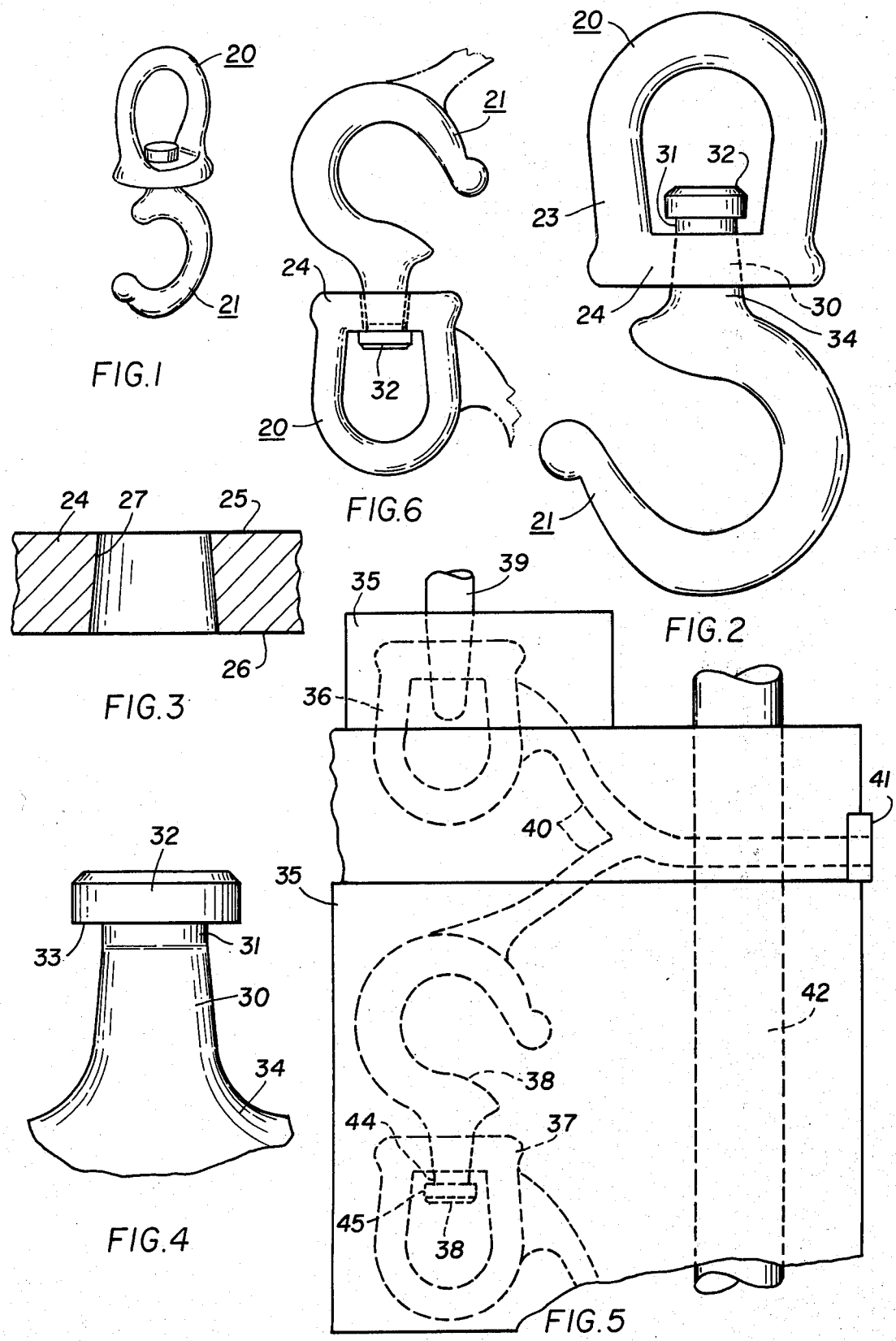

SWIVEL HOOKS AND METHOD FOR MAKING THE SAME

This is a division, of application Ser. No. 549,313, filed Feb. 12, 1975.

This invention relates to articles having relatively pivotable components, and a method of making such articles, and is particularly directed to such articles, and the method of forming same, whereby the pivotable joint between the elements is completely free.

As will be apparent in the following paragraphs, the invention is directed especially to swivel hooks. The pivotable joints in swivel hook articles is preferably completely free since, unlike pivotable joints in some other articles such as hinges, it is not always feasible to transmit sufficient forces to the swivel hook to effect its rotation. For example, if the swivel hook is employed to suspend an article by means of a cord, it is desirable that rotation of the article to alter its position will also affect the rotation of the hook elements. It is consequently desirable to make articles of this type as freely pivotable as possible.

In the past various forms of swivel hooks have been provided. In general, such hooks have been purely utilitarian in appearance, due to the method required to form them and the necessity of minimizing costs in their production, and have hence not been particularly desirable for use in locations where ornamental aspects are necessary.

The present invention is thus directed to the provision of a swivel hook that can economically be fabricated, and which may readily be provided with a pleasing ornamental appearance.

In the past it has been common to employ such techniques as die casting or plastic molding in the formation of articles that have pivotable joints, and that have ornamental appearances. In the past, however, the pivotable joints of such articles have not had sufficient freedom to enable their use in swivel hooks, or other products requiring extremely free joints.

The invention is thus further directed to the provision of a pivotable joint, adaptable to be formed by casting or molding techinques, whereby the pivotable joints are freely movable. In addition, the invention is directed to a method for forming such articles.

Briefly stated, in accordance with the invention, an article is provided having first and second elements which are assembled to form a pivotable joint therebetween. The first element has a frustoconical hole extending therethrough. and the second article, which may be the hook of a swivel hook, has a frustoconical projection adapted to mate the frustoconical aperture of the first element. An extension is provided on the projection of the second element, at the lesser diameter end of the frustoconical portion thereof, the extension having a maximum transverse dimension that is smaller than the smaller diameter end of the frustoconical hole. This arrangement enables the projection to be moved relative to the frustoconical hole, so that the extension extends into alignment with the end of the frustoconical hole, thereby ensuring adequate spacing of the frustoconical bearing surfaces that free movement between the elements is attained.

Further, in accordance with the invention, in the production of an article having first and second relatively pivotable elements, the first element is first formed with a frustoconical bearing surface, and then the second element is cast or molded with the bearing surface of the first element forming a portion of the die for the bearing surface of the second element. The element whose bearing surface constitutes a projection is formed with an extension, preferably cylindrical, having a maximum transverse dimension less than the diameter end of the frustoconical bearing surface. The extension also has an axial length substantially less than the axial length of the frustoconical bearing surfaces. Following the formation of the elements, the elements are moved relative to one another whereby the extension is moved into alignment with the end of the frustoconical aperture in the other element, so that the pivotable joint between the two elements is completely freed.

In order that the invention will be more clearly understood, it will now be described in greater detail, with reference to the following Figures, wherein:

FIG. 1 is a perspective view of a swivel hook in accordance with one embodiment of the invention;

FIG. 2 is a plan view of the hook of FIG. 1, prior to relative movement of the two elements to free the pivotable joint;

FIG. 3 is an enlarged detail view of a portion of the hook of FIGS. 1 and 2;

FIG. 4 is an enlarged detail view of another portion of the hook of FIG. 1;

FIG. 5 is a simplified illustration of a method of forming the hook of FIG. 1;

FIG. 6 is a simplified illustration of the finished form of the hook of FIG. 1;

Figure 7:
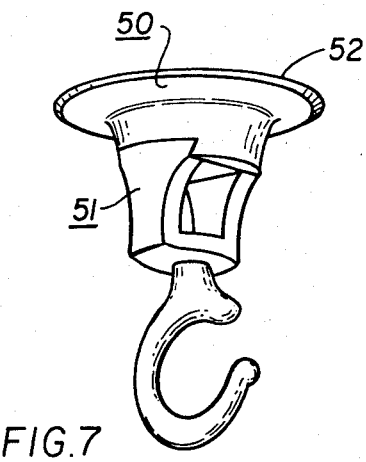
FIG. 7 is a perspective view of a swivel hook in accordance with a second embodiment of the invention.

Referring now to the drawings, and more in particular to FIG. 1, therein is illustrated a swivel hook in accordance with one embodiment of the invention. The swivel hook is comprised of two unitary components, i.e., a yoke 20 and a hook 21 pivotally mounted to the yoke. The elements of the hook may be formed, for example, of a die casting metal or a molded plastic material. By forming the swivel hook of such materials, it is possible to provide the elements with ornamental designs, thereby to enhance the appearance of the hook. In use, the swivel hook of FIG. 1 may be mounted with the yoke 20 extending over any suitable mounting member, whereby the hook 21 may be swiveled to any desired angular position for suspending an article. If desired the yoke 20 may be provided with an aperture (not shown) extending vertically through its upper portion, for mounting of the hook by other means. As an example, if it is desired to hang the hook on a cord, the cord may be passed through such an aperture and knotted at its lower portion to suspend the yoke as desired.

In the provision of a hook such as illustrated in FIG. 1 it is necessary that the hook portion 21 be freely rotatable with respect to the yoke 20. Conventional die casting and plastic molding techniques are not readily adaptable to the provision of free pivotal movement, unless the bearing surfaces of the elements are undesirably loose or if complicated and time consuming steps are taken in the formation of the hook.

As will be apparent in the following paragraphs, the present invention is particularly directed to the provision of a hook, as well as other articles, having freely swivelable joints, wherein the second element to be formed is molded or cast with the bearing surfaces of the first formed element serving as a die for the bearing surfaces of the second formed element. Such techniques are disclosed, for example, in U.S. Pat. No. 2,818,494, Morin.

When pivotal joints are formed by such techniques, these joints will initially be quite stiff due, for example, to imperfections in the first cast bearing surface. Several techniques are known for loosening such pivot joints. For example, as disclosed in U.S. Pat. No. 3,742,555, the bearing surfaces may be formed with frustoconical shapes, and one of the articles may be staked or deformed in such a manner that the bearing surfaces are moved apart to free the joint. Such a technique is of course not adaptable in the formation of all types of articles. In another technique, as disclosed in co-pending application Ser. No. 435,193, filed June 21, 1974, when an article having only a single joint is provided, the internal frustoconical bearing surface may be made axially longer than the fructoconical surface of the outer bearing member, whereby the joint may be freed by axial movement of the inner member.

While each of the above two techniques for providing free pivoting movement is satisfactory for some purposes, such as hinges, wherein a certain degree of force can be expected to rotate the joint in use, the techniques are not adaptable to provide the free pivotal movement necessary in a swivel hook of the type illustrated in FIG. 1.

FIGS. 2–4 more clearly illustrate the swivel hook of FIG. 1 in accordance with the invention. Thus, FIG. 2 is a plan view of the assembled hook after the die casting or molding of the yoke 20 and hook 21, FIGS. 3 and 4 are enlarged plan views of the yoke 20 and hook 21 respectively.

As shown in FIGS. 2 and 3, the yoke is comprised of a U-shaped member 23, forming the upper portion of the swivel hook, the ends of the yoke portion 23 being joined by a bridge 24 extending thereacross. The bridge 24 may have a generally flat upper and lower surface 25 and 26 respectively, preferably at least in the vicinity of a tapered hole 27 extending through the bridge between the surfaces 25 and 26. The hole 27, which forms a frustoconical bearing surface, has its lower diameter end directed toward the U-shaped member 23. As an example, the angle of taper of the hole 27 may be about 5°, although it will be understood that this is not a limiting feature of the present invention.

As illustrated in FIGS. 2 and 4, the hook 21 preovided with an upwardly extending frustoconical projection 30 having the same taper and substantially the same axial length as the hole 27 in the yoke. A cylindrical portion 31 is provided coaxially extending from the upper smaller diameter end of the projection 30. The cylindrical portion 31 has a diameter less than the diameter of the smaller end of the projection 30. As an example, the cylindrical portion may have a diameter of 0.225 inches, with the smaller diameter end of the projection 30 having a diameter of 0.235 inches. In addition, the axial length of the cylindrical portion 31 is substantially less than the axial length of the frustoconical portion 30. For example, in one embodiment of the invention the cylindrical portion 31 has an axial length of 0.43 inches, with the frictional projection 30 having an axial length of 0.210 inches and equal to the axial length of the hole 27 in the yoke.

An enlarged portion 32 is provided on the upper end of the cylindrical portion 31, the enlarged portion 32 having outer dimensions greater than the diameter of the smaller end of the fructoconical portion 30. In addition, it is preferred that the undersurfaces 33 of the enlarged portion 32 facing the hook 21 be flat, for engagement with the upper surface 25 of the bridge of the yoke. Further, the portion 34 of the hook 21 adjacent the projection 30 preferably has a transverse dimension at least as great as the larger diameter end of the hole 27.

While in the above example the portion 31 was described as being cylindrical, it will be apparent that a round cross section of this portion is not necessary, as long as its cross sectional area is sufficiently large to withstand the load expected to be placed on the hook, and as long as its maximum transverse dimention is less than the lower diameter end of the hole 27.

FIG. 5 illustrates, in simplified form, a casting technique for forming the swivel hook of FIGS. 1–4. This drawing illustrates one die member of a set of movable dies, the die member 35 having a first cavity 36 shaped to form the yoke member, and a second cavity 37 in the form of the yoke adjoined to a cavity 38 shaped to form the hook in the relative positions illustrataed in FIG. 2. An aperture is provided in the die, into which a tapered pin 39 extends through the portion of the cavity 27 corresponding to the frustoconical hole in the yoke. The die member is also provided with cavity 40 to form the gates.

In a first casting sequence, a yoke member has been previously die cast and fitted in the cavity 37. Then, a suitable die casting material, such as Zamak No. 3 zinc alloy is injected into the dies at the aperture 41 to flow around a core rod 42 in conventional manner, and thence by way of the cavities 40 to the cavities 36 and 38. Thus, a yoke is formed in the cavity 36, and a hook is formed in the cavity 38 pivotally attached to the yoke previously set in the cavity 37. The pin 39 is then axially withdrawn, the dies opened, and the core rod 42 axially displaced downwardly to set the yoke formed in the cavity 36 into the cavity 37. Then, upon closing of the dies and reinserting the pin 39, the procedure is repeated. The gates formed on the components are removed by conventional practice.

The die may be provided with a removable insert 43 for forming the U-shaped member of the yoke, for example, with a central hole for mounting. In this case, the pin 39 may be provided with an axial extension extending rhrough the U-shaped portion, so that this hole may also be formed in the yoke during the die casting process.

The cavity 36, cooperating with the pin 39, is shaped to form the yoke as above described with reference to FIG. 2, so that a frustoconical aperture extends between the opposed surfaces of the bridge of the yoke. The cavity 36 is shaped to form the hook portion of the hook, with the frustoconical hole in the yoke inserted in the cavity 37 thus forming the die for the frustoconical projection of the hook. The die portion 38 has a cylindrical cavity 44 corresponding to the cylindrical portion on the projection of the hook, and an enlarged cavity 45 for forming the enlarged end on the cylindrical portion. It is to be noted that, in the arrangement illustrated in FIG. 5, as in the illustration of FIG. 2, the cylindrical portion is exposed, i.e., it is axially displaced from the frustoconical surface of the yoke member. In this position, after the completed hook has been removed from the die, the pivotaly joint will not be free. Accordingly, as illustrated in FIG. 6, the elements 20 and 21 of the hook are relatively moved, so that the cylindrical portion on the frustoconical projection extends into the frustoconical aperture of the yoke. In other words, referring to FIG. 2, the hook 21 is moved relative to the yoke 20 in the direction extending between the surfaces 25 and 26 of the yoke. By this means, the frustoconical bearing surfaces of the two elements are slightly separated, to provide very free pivotal movment therebetween, the freedon of movement being satisfactory for a swivel hook.

As above discussed, in one prior technique for loosening a pivotal joint, the frustoconical projection on the one element was formed to be longer than the frustoconical hole in the other element, whereby the joint could be freed by axial movement of the projection with respect to the aperture. It has been found, however, that this technique does not provide a completely free pivotal movement between the two elements. Thus, if a slight inaccuracy occurs in the dies, with respect to the alignment of the extension of the frustoconical projection and the frustoconical aperture serving to form the die for the remainder of the frustoconical projection, freeing of the joint by relative movment of the elements will result in a slight degree of binding, and hence a completely free swiveling joint will not result. In the arrangement of the present invention, it has been found that a mismatch of the up to 0.005 inches between the axis of the cylindrical projection and the axis of the frustoconical aperture will not interfere with the production of a completely free joint.

Figure 8:
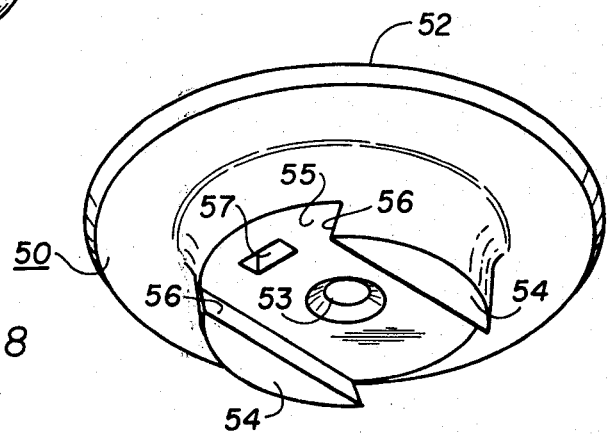
FIG. 8 is a perspective view of the mounting plate of the swivel hook of FIG. 7.
Figure 9:
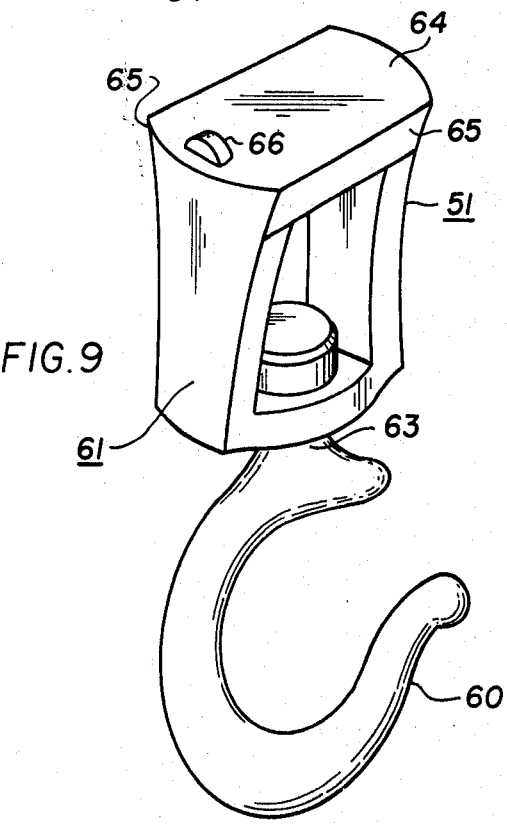
FIG. 9 is a perspective view of the lower portion of the swivel hook of FIG. 2.

In another embodiment of the invention, as illustrated in FIGS. 7–9, a swivel hook is provided especially adapted to be mounted on a ceiling, without the showing of support means such as screws or the like. This arrangement is comprised of a plate 50 adapted to be affixed to the ceiling, and a swivel hook 51 releasably affixed to the plate 50.

Referring to FIG. 8, the plate 50 may be circular in shape and has an upper flat surface 52 adapted to be fitted against a ceiling. A central hole 53 extends through the plate, so that the plate may be mounted to the ceiling by means of a conventional fastener such as a screw. The plate is further provided with a guide in the form of a pair of generally parallel downwardly extending projections 54 on opposite sides of a flat surface 55 parallel to the surface 52. The facing surfaces of the projections 54 are bevelled, so that surfaces are further apart at the surface 55 than at the lower extremity of the projections, in order to form a guide. For example, the incline of the surfaces 56 may be at 30° with respect to the perpendicular to the plate 50. In addition, the surfaces 56 do not extend exactly parallel, and are thus closer together at one end than the other. Thus, when a mating piece is inserted in the guide formed by the projections 54 in the surface 55, it will be locked in place at a desired position. In addition, an aperture 57 is provided extending into the surface 55. This aperture 57 may, if desired, extend completely through the plate 50, in order to simplify the manufacture of the article. As will be noted in the figure, the mounting holes 53 extends through the suface 55.

Referring to FIG. 9, the swivel hook is formed of a hook portion 60 and a mounting yoke 61. The mounting yoke 61 has a lower bridge 62 with a tapered hole extending therethrough. The hook 60 has an upwardly extending projection 63 formed in the same manner as above disclosed with reference to FIGS. 1–6, and hence a swivel joint is provided between the yoke member 61 and the hook 60 in the same manner as above described. The upper portion of the yoke 61 is formed to mate in the guide of the plate 50. Thus, the yoke has an upper generally flat surface 64 bounded on two opposite sides by bevelled surfaces 65 shaped to match the configuration of the flat surface 55 and surfaces 56 of the plate 50. In addition, a projection 66 is provided on the flat surface 64, the projection 66 being positioned to be aligned with the aperture 57 when the hook element 51 is mounted to the plate 50.

In use, the plate 50 is secured to a ceiling, for example by means of a screw, and then the hook member is affixed to the plate member by sliding the upper portion of the yoke 61 into the mating lower portion of the plate 50 until the projection 66 engages the aperture 57. The engagement of the projection 66 in the aperature 57 serves to lock the hook 51 in place. In addition, the non-parallel alignment of the edges of the projection 54, and the corresponding non-parallel alignment of the surfaces 65 of the hook 51 serve to lock the hook 51 to the plate 50. Thus, the hook is inhibited from movement with respect to the plate 50 by two means, i.e., the mating guide means and upper portion of the yoke 61, and the projection 66 and aperature 57.

The swivel hook illustrated in FIGS. 7–9 is particularly adaptable to the hanging of articles such as planter pots from a ceiling, although it will be apparent that it may also be employed in other applications. The plate 50 may be cast of a die casting metal or molded of a plastic material, as may be the hook portion 51 as above discussed, and hence the swivel hook in accordance with FIGS. 7–9 may be shaped to have any desired ornamental configuration, whereby it may be advantageously employed in locations where purely utilitarian hooks would be inappropriatae.

Figure 10:
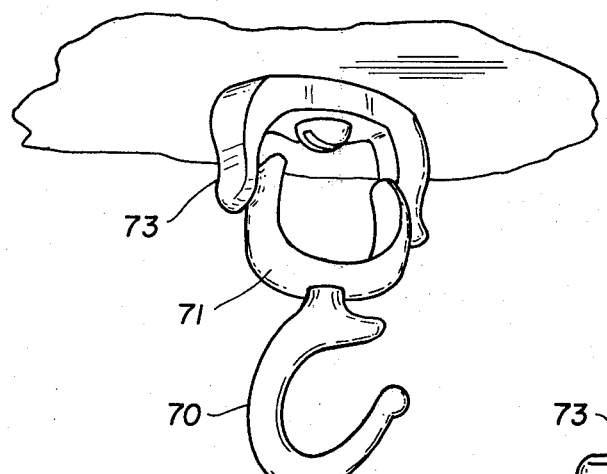
FIG. 10 is a perspective view of a third embodiment of a swivel hook in accordance with the invention, mounted on a horizontal surface.
Figure 11:
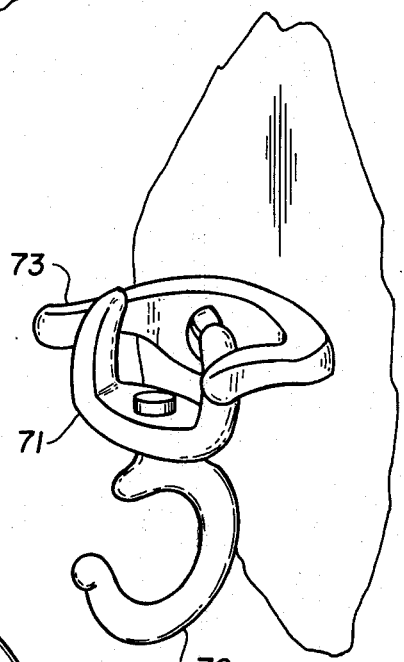
FIG. 11 is a perspective view of the hook of FIG. 10 mounted on a vertical surface.
Figure 12:
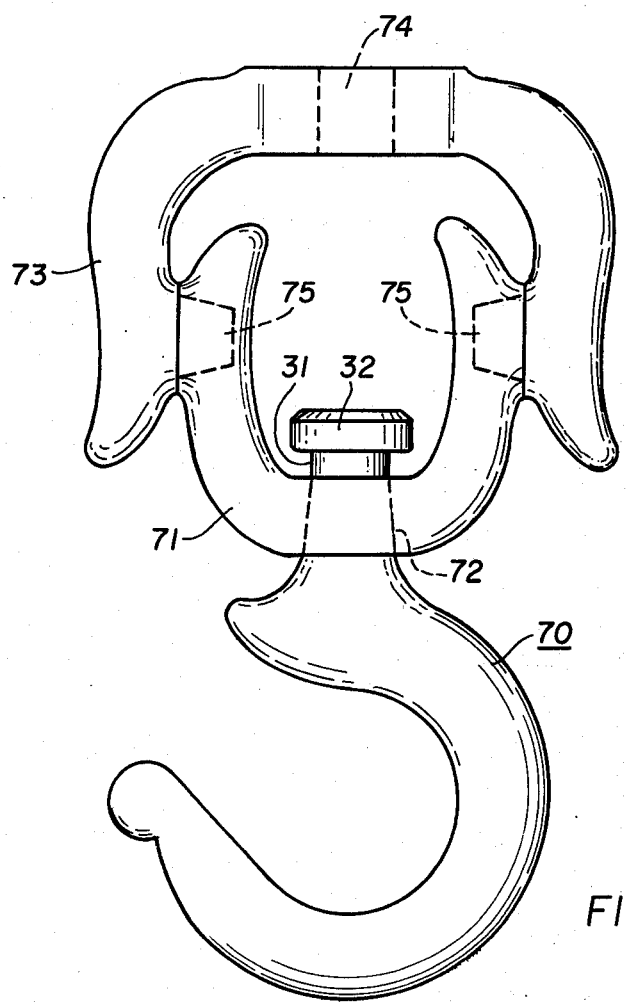
FIG. 12 is a plan view of the swivel hook of FIGS. 10 and 11.

A still further embodiment of a swivel hook in accordance with the invention is illustrated in FIGS. 10–12. This swivel hook is formed of a hook member 70 formed in the same manner as the hook illustrated in FIGS. 1–6. In addition, the swivel hook of FIGS. 10—12 has a yoke member 71 with a central frustoconical hole 72 forming the bearing surface for the projection of the hook 70. The ends of the yoke 71 are separately pivotally mounted to the ends of a yoke member 73, and a central aperture 74 is provided in the yoke 73 for mounting of the swivel hook. The pivotal interconnection between the yokes 71 and 73 may also be formed by a casting technique, in which case one of these members, for example the yoke 73 may be provided with frustoconical projections 75 which are fitted into mating frustoconical apertures in the yoke member 71.

The swivel hook of FIGS. 10–12 provides several advantages. Thus, as described above, the hook may be mounted by means of a screw extending through the hole 74 in yoke 73. For the purposes of mounting, the yoke 71 may be pivoted out of alignment with the center of the yoke 73, so that the mounting screw may be inserted without difficulty in the mounting hole 74. In addition, the swivel hook of FIGS. 10–12 is adapted to be mounted on the ceiling, as illustrated in FIG. 10, or on a vertical surface as illustrated in FIG. 11, since a universal coupling arrangement is provided in this article.

The swivel hook of FIGS. 10–12 may be formed by casting of a die casting metal, or by molding of a suitable plastic. As an example, the swivel hook may be formed in a two-step process by first forming the hook 70 and the yoke 73, and then forming the center yoke 71, employing the bearing surfaces of the hook 70 and yoke 73 as the corresponding mating bearing surfaces of the yoke 71. Alternatively, the center yoke 71 may be die cast or molded first, followed by the simultaneous die casting or molding of the yoke 73 and hook 70, whereby the bearing surfaces of the yoke 71 form the dies for the corresponding bearing surfaces of the yoke 73 and hook 70.

Figure 13:
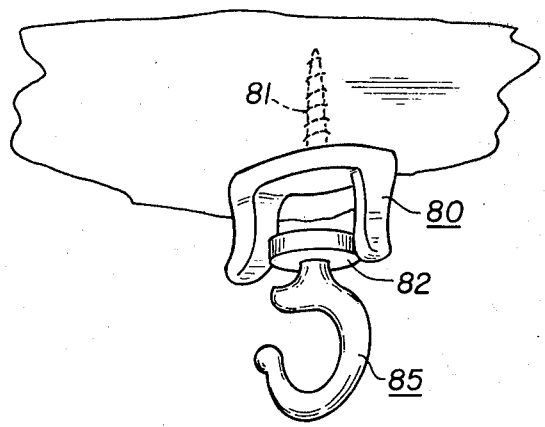
FIG. 13 is a perspective view of a swivel hook in accordance with a fourth embodiment of the invention, mounted on a horizontal surface.
Figure 14:
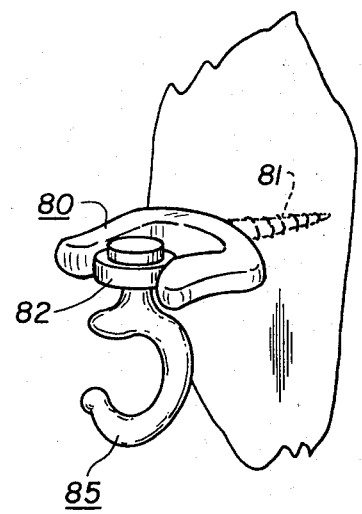
FIG. 14 is a perspective view of the swivel hook of FIG. 13 mounted on a vertical surface.
Figure 15:
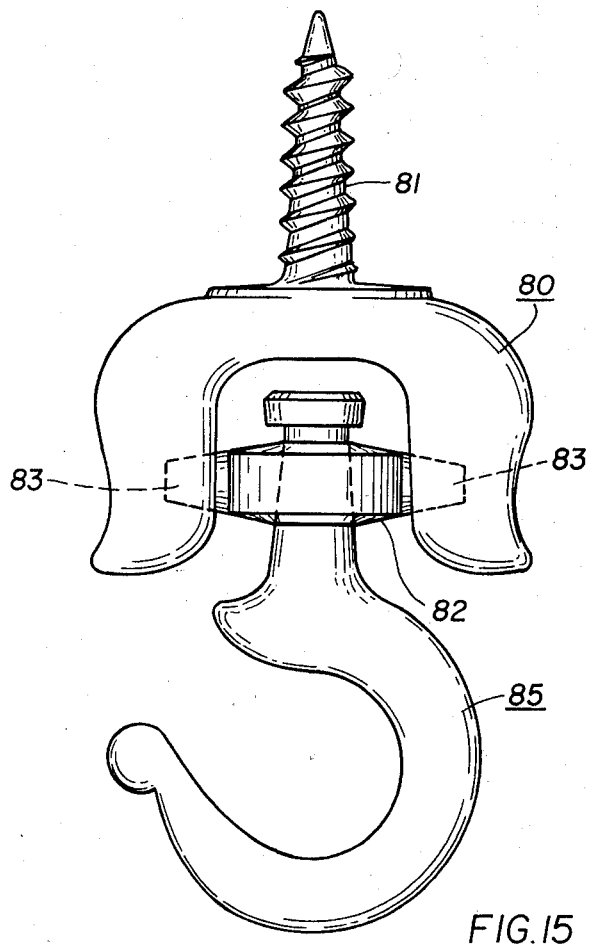
FIG. 15 is a plan view of the swivel hook of FIGS. 13 and 14.

In a still further embodiment of a swivel hook in accordance with the invention, as illustrated in FIGS. 13–15, a yoke member 80 is provided with a mounting screw 81 affixed to the central portion therein. A bridging member 82 is pivotally mounted between the ends of the yoke 80. The bridging member 82 may for example, have a circular cross section, and is provided with projections 83 which extend into the ends of the yoke 80 to form the pivotal connection therebetween. The swivel hook of FIGS. 13–15 also comprise a hook element 85 formed in the same manner as the hook element of the embodiment of the invention illustrated in FIGS. 1–6. The bridge member 82 is provided with a central frustoconical hole to provide the bearing surface for the frustoconical projection on the hook 85.

The hook illustrated in FIGS. 13–15 also has a universal movement, so that it may advantageously be mounted on a ceiling, as illustrated in FIG. 13, or on a wall as illustrated in FIG. 14.

The swivel hook of FIGS. 13–15 may be formed by a die casting or molding technique similar to that employed in the fabrication of the swivel hook of FIGS. 10–12. For example, the bridging member 82 may first be cast or molded, followed by the simultaneous casting or molding of the yoke 80 and hook 85, employing the bearing surfaces of the bridge member 82 as the bearing portions of the die for the casting of the yoke 80 and hook 85. Alternatively, of course, the hook 85 and the yoke 80 may be first simultaneously cast, followed by the casting of the bridge member 82 as above discussed. The screw 81 may also be die cast as a unitary part of the yoke 80, or it may be comprised of a screw of harder material around which the yoke 80 is cast.

The yoke 80, as is apparent in FIGS. 13–15, has a "wing" shape, functionally similar to a wing nut so that the user may apply torque to the yoke 80 with his fingers. This facilitates the installation of the hook, since additional tools, such as screwdrivers, are not required to screw the screw 81 into a surface.

While the invention has been described and disclosed with reference to a limited number of embodiments, it will be apparent that modifications and variations may be made therein. Thus, the method and apparatus in accordance with the broad aspects of the invention may be employed for other articles, such as eyes or threaded bolts, as well as many other types of articles. In addition, the hanging arrangements, such as for example, the arrangement of FIGS. 7–9, may be employed for other hanging devices such as quarter turn fasteners, etc. It is therefore intended in the following claims to cover each such variation and modification as falls within the true spirit and scope of the invention.

What is claimed is:

1. In an articulated article of the type comprising a first element having a frustoconical projection and a second element having a frustoconical aperture fitted on said projection to form an articulated joint, said frustoconical projection having an axial length substantially equal to the axial length of said aperture, the improvement wherein said first element further has an extension on the smaller diameter end thereof and axially aligned with said projection, said extension having a lesser maximum transverse dimension than the minimum diameter of said frustoconical projection and a substantially lesser axial length than said frustoconical projection.

2. The articulated article of claim 1 wherein said extension is cylindrical.

3. A swivel hook comprising a hook having a frustoconical projection with the smaller diameter end thereof away from said hook, an extension on said smaller diameter end having lesser maximum transverse dimension than the lesser diameter end of said frustoconical projection and an axial length substantially smaller than the axial length of said frustoconical projection, and an enlarged end on said extension, and mounting means for said hook comprising an element having a frustoconical hole extending therethrough having a length substantially equal to the length of said frustoconical projection of said hook and larger and lesser diameters substantially equal to the lesser and larger diameters of said frustoconical projection, said projection being fitted into said hole with said extension extending into the lesser diameter end of said hole.

4. The swivel hook of claim 3 wherein said element having a frustoconical hole comprises a U-shaped mounting member, and a bridge fixedly extending across the ends of said U-shaped member, said frustoconical hole extending through said bridge.

5. The swivel hook of claim 3 wherein said element comprises a first U-shaped yoke, said frustoconical hole extending through the center of said first U-shaped yoke, and a second U-shaped mounting yoke, the ends of said first U-shaped yoke being separately pivotally mounted to the ends of said second U-shaped mounting yoke, and a mounting aperture in the center of said second U-shaped yoke.

6. The swivel hook of claim 3 wherein said element comprises a bridging member, said frustoconical hole extending through said bridging member, and a U-shaped yoke, the ends of said bridging member being pivotally mounted in the ends of said U-shaped mounting yoke.

7. The swivel hook of claim 6 wherein said element further comprises a screw fixedly mounted to the center of said U-shaped yoke and extending in a direction transversely away from the pivotal axis of said bridging member, said U-shaped member being wing-shaped to form a grip for screwing said screw in a mounting surface.

8. The swivel hook of claim 3 wherein element comprises a plate having a first surface adapted to be mounted against a mounting surface, a mounting aperture extending centrally therethrough, a pair of projections extending from the side thereof opposite said first surface and defining a guide slot and further comprising a mounting member having an end shaped to fit said guide slot, said frustoconical hole extending through said mounting member.

9. The swivel hook of claim 8 wherein said guide slot defined by said projections is further defined by a flat surface of said plate parallel to said first surface, said guide slot having tapered non-parallel edges, with one end of said guide slot being wider than the other.

10. The swivel hook of claim 9 wherein said plate further has a second aperture in said flat surface, and said mounting member has a projection positioned to engage said second aperture whereby said mounting member may be slid into said guide slot and locked in place by engagement of said projection with said second aperture, said first mentioned aperture extending from said flat surface.

11. A swivel hook comprising first and second U-shaped elements pivoted together at a pair of aligned pivot joints at the ends of said first and second U-shaped elements, a mounting hole in the center of said first U-shaped element and normal to the pivotal axis between said first and second U-shaped elements, whereby said second U-shaped element intercepts the axis of said mounting hole in one relative position of said first and second U-shaped element and is clear of said axis of said mounting hole in another relative position of said first and second U-shaped elements, and a hook element pivotally mounted to the center of said second U-shaped member.

12. The swivel hook of claim 11 wherein the ends of said second U-shaped element lie inwardly of the ends of said first U-shaped element along the pivotal axis therebetween.

13. The swivel hook of claim 11 wherein the pivotal axis of said hook element is aligned with the axis of said hole in said one relative position of said first and second U-shaped elements.

14. A swivel hook comprising a U-shaped mounting element, a bridge element extending between the ends of the U-shaped element and pivoted thereto, a mounting screw permanently affixed in said U-shaped element at the center thereof and extending away from the pivotal axis between said U-shaped element and said bridge element, the axis of said screw being normal to and intersecting said pivotal axis, and a hook portion pivoted to the center of said bridge element for rotation about an axis intersecting the axis of said screw and the pivotal axis of said bridge element, the ends of said U-shaped element being wing-shaped to enable manual rotation of said U-shaped element and hence said screw.

15. A hook comprising a first element having a wall mounting surface, a mounting element, means removably mounting said mounting element to said first element on the side thereof away from said mounting surface, and a hook depending from said mounting element, said mounting means comprising a first pair of opposite guide surfaces on said first element on the side thereof away from said mounting surface, said first surfaces lying in planes that converge toward one side of said first element and diverge toward said mounting surface, and a second pair of opposed guide surfaces on said mounting element, one of said pairs of surfaces defining the sides of a guide channel and the other of said pairs of guide surfaces defining the sides of a guide projection and being in engagement with said first guide surfaces.

* * * * *